Feb. 7, 1967 P. H. STANLEY 3,302,726
LAG-LEAD DAMPER FOR AIRCRAFT SUSTAINING ROTOR BLADES
Filed Oct. 23, 1965
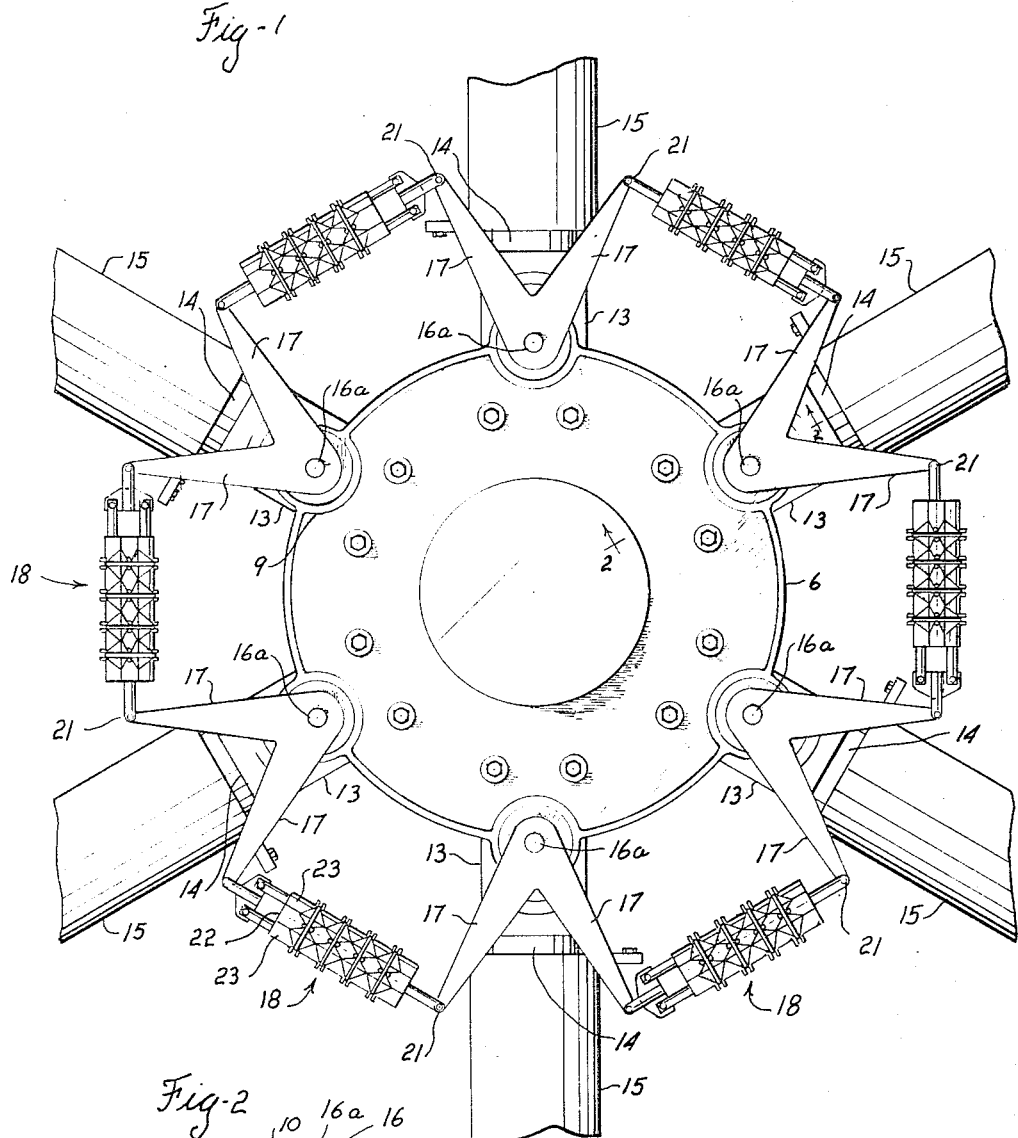
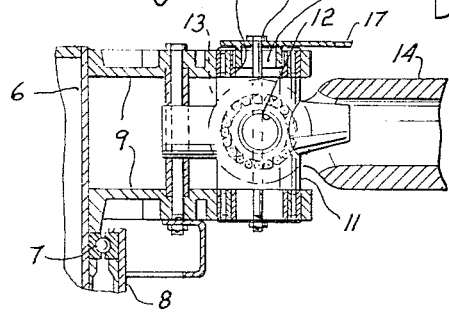
INVENTOR.
Paul H. Stanley
BY
ATTORNEYS Feb. 7, 1967  P. H. STANLEY  3,302,726
LAG-LEAD DAMPER FOR AIRCRAFT SUSTAINING ROTOR BLADES
Filed Oct. 23, 1965  2 Sheets-Sheet 2

INVENTOR.
Paul H. Stanley
BY
Sykpmtoct + Lehm
ATTORNEYS

United States Patent Office 3,302,726
Patented Feb. 7, 1967

3,302,726
LAG-LEAD DAMPER FOR AIRCRAFT
SUSTAINING ROTOR BLADES
Paul H. Stanley, Glenside, Pa., assignor to Autogiro
Company of America, Jenkintown, Pa., a corporation
of Delaware
Filed Oct. 23, 1965, Ser. No. 503,537
5 Claims. (Cl. 170—160.55)

This invention relates to rotary wing aircraft generally, including all such aircraft incorporating one or more sustaining rotors arranged to rotate about generally upright axes whether power driven through the hub or by blade jet drive, or whether capable of autorotative actuation under some or all flight conditions.

It is common in various forms of such rotary wing aircraft to provide a pivot mounting mechanism for the rotor blades, providing freedom for various force relieving movements of the blades under various flight conditions. In such sustaining rotors, the blade pivots frequently include not only horizontal or flapping pivots but also generally upright pivots providing upright pivot axes about which the rotor blades may move fore and aft in the mean plane of rotation, i.e., in the lag-lead sense.

For various purposes it is now well known to impose certain restrictions upon such lag-lead motions of sustaining rotor blades, and this restriction is ordinarily achieved by applying damper mechanisms to the rotor blades, particularly damper mechanisms which have a damping force which is nonresilient or nonrebounding, such as that provided by a hydraulic device or friction device.

It is a principal object of the present invention to provide a blade movement damper of the general class referred to having a nonrebounding type of reaction or restraint and in which the damping action progressively increases with increase in lag-lead blade motions in either direction from mid-position. In this way an unusually favorable damping action is provided which minimizes tendencies for the rotor blades to break into resonant or harmonic oscillations either in flight or when the aircraft is at rest on the ground. Heretofore resonance problems have sometimes arisen with various types of sustaining rotors for rotary wing aircraft especially when the aircraft is at rest on the ground but with rotor turning. Conditions of resonance arising under these circumstances are commonly referred to as "ground resonance," such conditions sometimes becoming quite violent. Indeed the violence of ground resonance has been known to seriously damage substantial portions not only of the rotor but also of the aircraft. The damping action provided by the damper device on the present invention is particularly well suited to the control or elimination of ground resonances of the kind referred to.

How the foregoing and other objects and advantages are attained will appear more fully from the following description referring to the accompanying drawings in which:

FIGURE 1 is a plan view of the central portion of a sustaining rotor of a rotary wing aircraft, illustrating the central rotor hub and root end fragments of six rotor blades pivotally connected with the hub, the view also illustrating a series of blade dampers in accordance with the present invention connected with the blades around the hub;

FIGURE 2 is a vertical sectional view through the root end mounting of one of the rotor blades on the hub and illustrating the mounting pivot arrangement employed, this view being taken in general as indicated by the line 2—2 applied to FIGURE 1;

Figure 3:
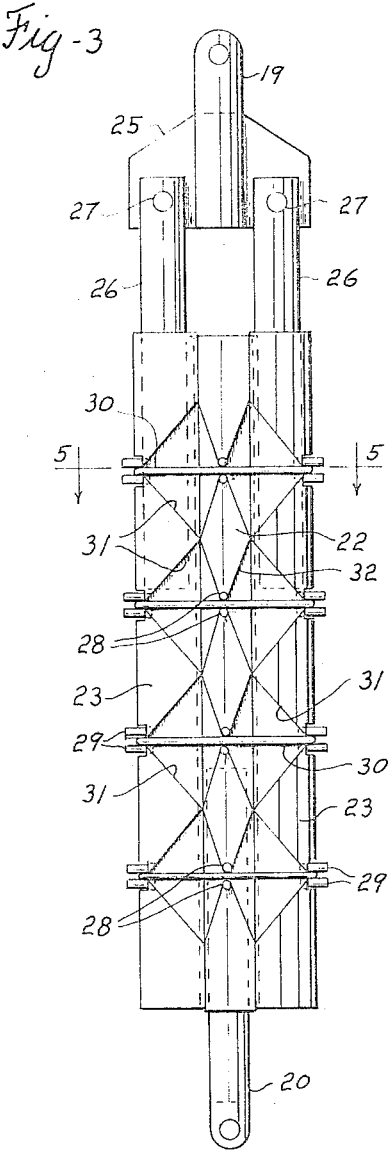
FIGURE 3 is a plan view of one of the damper devices shown in FIGURE 1 as applied to the rotor blades, the illustration in FIGURE 3 showing the damper device itself and being on an enlarged scale as compared with FIGURE 1.

Referring first to FIGURES 1 and 2, the rotor hub is indicated at 6. This part of the rotor head is rotative with the rotor blades and may be mounted by means of bearings such as indicated at 7 within a nonrotative hub support 8.

The hub structure includes pairs of apertured lugs 9—9 vertically spaced from each other and arranged to receive and mount the vertical pivot 10 which forms a part of the pivot block 11 having horizontally projecting pivot parts 12 adapted to cooperate with apertured lugs 13 which are formed on the root end mounting member 14 of each blade 15.

By the arrangement described just above each blade is provided freedom for pivotal movement in the "flapping" sense (about the axis of the pivot parts 12) and each blade is also provided freedom for movement in the lag-lead sense (about the axis of the pivot parts 10).

An internal part 16, keyed in the upper end of each hollow drag pivot 10, has a bell crank with arms 17 mounted thereon, this assembly of parts being held together by bolt 16a. The bell crank, the part 16 and the pivot 10 all move with the blade in the lag-lead sense, so that when viewed in plan as in FIGURE 1 the adjacent arms 17 of the bell cranks associated with adjacent blades around the rotor move toward and away from each other with the blades during lag-lead motion thereof.

Figure 4:
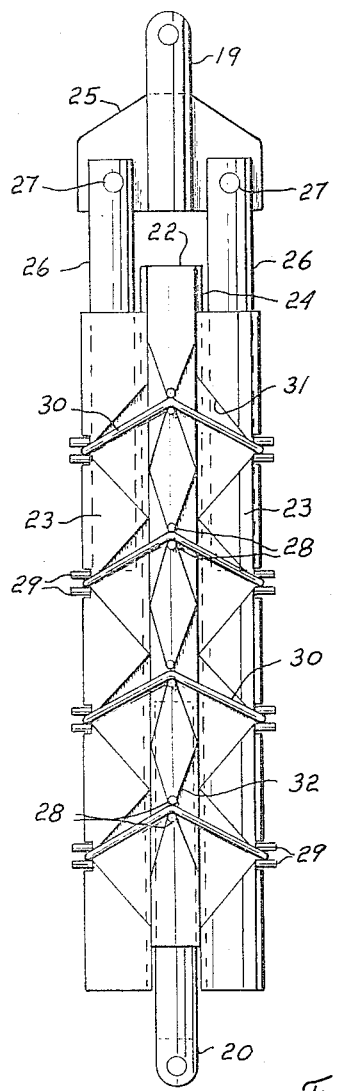
FIGURE 4 is a view similar to FIGURE 3 but illustrating certain parts of the damper in different relative positions.
Figure 5:
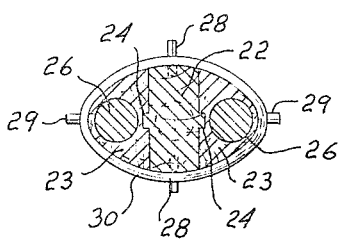
FIGURE 5 is a transverse sectional view through the damper taken as indicated by the section line 5—5 on FIGURE 3.

The lag-lead motions of the blades are damped or restrained by means of the damper devices indicated in FIGURE 1 by the numeral 18 and shown in greater detail in FIGURES 3, 4 and 5. Each of these devices includes terminal or connection members 19 and 20 at opposite ends, these connection members being apertured to receive the connecting pivots 21 by means of which the damper devices are connected to the bell crank arms 17.

In general, the damper device is made up of an assembly of damper members, including a central member 22 and a pair of outer members 23. The members 22 and 23 advantageously have tongue and groove interfitting parts 24 providing against lateral displacement of the parts but permitting longitudinal relative displacement of the damper member 22 with respect to the damper members 23. The damper member 22 is connected to the terminal fitting 20 for movement therewith and the members 23 are each connected with the beam 25 by means of rods 26 and the pivots 27. The terminal connector 19 is fastened to the beam 25, and by means of the pivotal connection of the rods 26 with the beam, the beam acts in the manner of an equalizer beam, distributing the force received by the terminal connector 19 equally on the two rods 26 and thus on the two damper members 23. The member 22 is provided with oppositely disposed pairs of guide pins 28 and each of the members 23 is similarly provided with pairs of guide pins 29. These sets of guide pins serve to anchor or position elastic or yielding bands 30 which surround the assembly of damper members 22 and 23 and thus maintain the damper members in the assembled relation illustrated in FIGURE 5. The bands 30 thus serve to establish the pressure of friction contact between the interengaging faces of the members 22 and 23.

If desired, recesses or cutout areas indicated at 31 may be provided on the members 23 and similar cutouts 32 may be provided on the member 22 thereby providing recesses in which the bands 30 are received to avoid projection of the bands beyond the exterior surface of the assembly of damper members.

In a typical case, the members 22 and 23 may be formed of wood, but other materials may also be employed, and in either event the interengaging surfaces of the members may be treated or lined with material adapted to establish any desired coefficient of friction.

It will be observed from FIGURES 1 and 3 that in the mid-position of lag-lead motion of the blades, the damper members 22 and 23 also occupy a mid-position in which the associated elastic bands 30 lie in perpendicular planes through the damper assembly. In contrast, when one blade moves in the lag-lead sense with respect to an adjacent blade around the rotor hub, the resultant linear displacement of the member 22 relative to the members 23 results in a deflection of the bands 30, thereby stretching those bands and causing them to increase the pressure of interengagement of the damper parts. This results in automatic increase in the damping action with increase in relative deflection of adjacent rotor blades around the hub. It will be noted that the damping action is an inter-blade action, rather than a damping action of any given blade with respect to the hub, so that the dampers are effective only for relative lag-lead motions of the blades, rather than with respect to absolute pivotal motion of any blade with respect to the hub.

Although the dampers constructed according to the present invention may be arranged to react between the blades and the hub, the arrangement of the dampers to react between adjacent blades, as is illustrated in the drawings and described above, has certain advantages, including minimization of transmission of damper loads and thus vibrations from the blades to the hub and thus to the air frame of the aircraft. In addition the inter-blade connection of the dampers tends to minimize damper wear, because the relative motions of the blades are in general of lesser magnitude than the motions of the blades with respect to the hub.

The progressive increase in the frictional restraint or damping action with increase in relative lag-lead displacement of the blades is particularly desirable in rotors of the kind disclosed in order to resist tendencies for the blades to set up resonant oscillations about the drag pivots particularly under certain conditions when the aircraft is on the ground with the rotor turning, and also during high speed translational flight of the aircraft.

I claim:

1. In an aircraft sustaining rotor having a plurality of blades individually pivotally mounted for lag-lead motion about upright axes, a blade movement damper device connected to react between adjacent blades around the rotor to resist relative lag-lead movements of adjacent blades, the damper device comprising an assembly of damper members linearly displaceable with respect to each other in either direction from a mid-position and having friction surfaces in contact with each other, one such member being connected with one blade to move therewith and another such member in frictional contact with the first being connected with an adjacent blade to move therewith, and means for urging the damper members into frictional interengagement including means providing for progressive increase in the pressure of frictional interengagement with increase in displacement movement thereof in either direction from said mid-position.

2. A construction according to claim 1 in which the assembly of damper members includes three such members, one positioned between the other two, said one being connected with one blade and the other two being pivotally connected to a beam on spaced axes, and means for pivotally connecting the beam at a point between said spaced axes with an adjacent blade.

3. In an aircraft sustaining rotor having a plurality of blades individually pivotally mounted for lag-lead motion about upright axes, a blade movement damper device connected to react between adjacent blades around the rotor to resist relative lag-lead movements of adjacent blades, the damper device comprising an assembly of damper members linearly displaceable with respect to each other in either direction from a mid-position and having friction surfaces in contact with each other, one such member being connected with one blade to move therewith and another such member in frictional contact with the first being connected with an adjacent blade to move therewith, and means for urging the damper members into frictional interengagement comprising elastic elements extended generally transverse the direction of relative linear displacement of the damper members and anchored thereto to provide for progressive increase in distension of the elastic elements with displacement of the damper members in either direction from the mid-position.

4. A construction according to claim 3 in which the elastic elements comprise bands surrounding the assembly of damper members.

5. In an aircraft sustaining rotor having a plurality of blades individually pivotally mounted for lag-lead motion about upright axes, a lag-lead motion damper device comprising an assembly of damper members linearly displaceable with respect to each other in either direction from a mid-position and having friction surfaces in contact with each other, and means for urging the damper members into frictional interengagement including means providing for progressive increase in the pressure of frictional interengagement with increase in displacement movement thereof in either direction from said mid-position.

References Cited by the Examiner

UNITED STATES PATENTS

| | | | |
|---|---|---|---|
| 2,494,985 | 1/1950 | Campbell | 170—160.55 |
| 2,638,991 | 5/1953 | Pitcairn | 170—160.55 X |

MARTIN P. SCHWADRON, *Primary Examiner.*

EVERETTE A. POWELL, *Examiner.*